Nov. 18, 1958     H. A. HESSLER     2,860,811
PRESSURE COOKER SAFETY DEVICE
Filed March 21, 1957
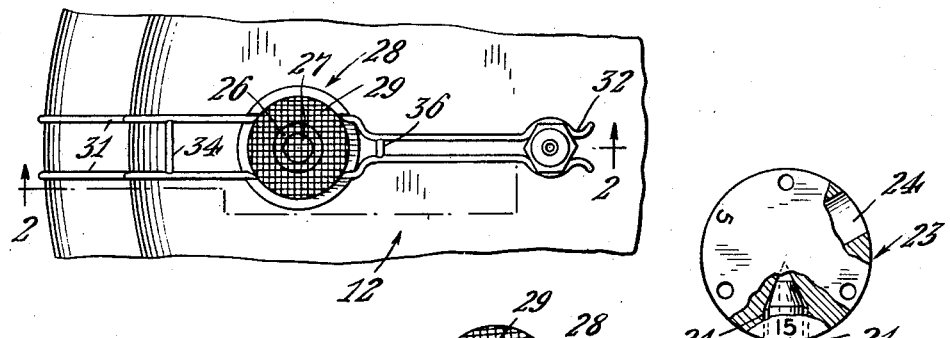
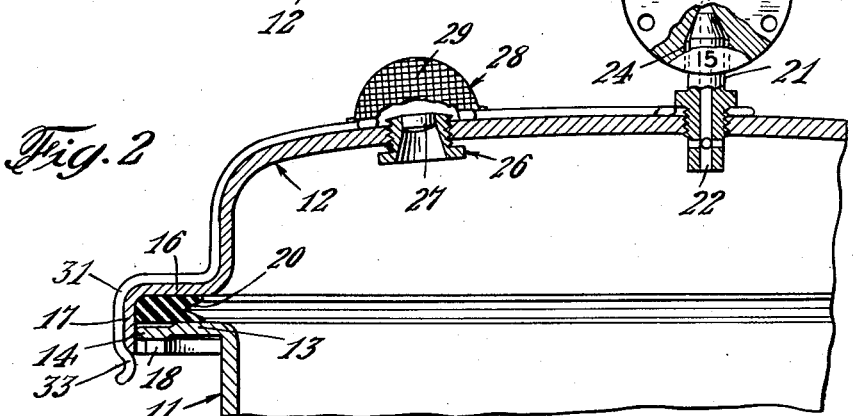
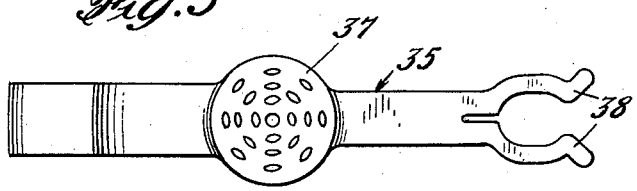
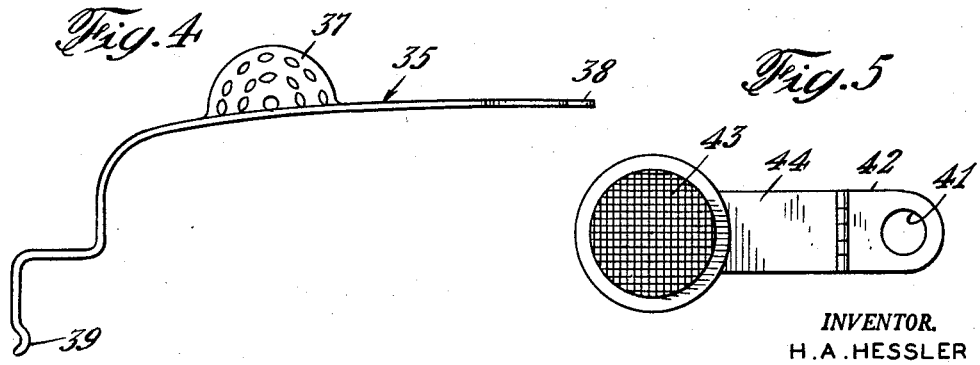
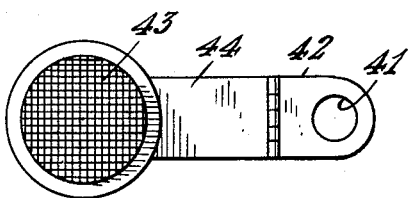
INVENTOR.
H.A. HESSLER
BY
*M. R. Marsh*
ATTORNEY

United States Patent Office 2,860,811
Patented Nov. 18, 1958

2,860,811

PRESSURE COOKER SAFETY DEVICE

Harold A. Hessler, New York, N. Y.

Application March 21, 1957, Serial No. 647,717

1 Claim. (Cl. 220—44)

The present invention relates primarily to safety devices and more particularly to safety devices for use in connection with pressure cookers of the type employed to prepare foods in the homes.

It is well known that most foods such as meats and vegetables will thoroughly cook under a few pounds of pressure, ten or fifteen pounds for example, in a much shorter period of time than is required to cook the same foods under normal or atmospheric pressure. Also, pressure cooking improves the color appearance of some foods such as peas. For these reasons domestic food pressure cookers have come into quite general use.

Such pressure cookers usually consist of a conventional shaped pot to which a cover or lid can be removably locked so as to produce a pressure tight closed container. The two pieces may be locked together by a number of different ways, the most general method being by interengaging projections at the rims of cover and pan, with the projections being brought into locking engagement by a slight amount of rotation of one piece with respect to the other. A rubber or rubber-like gasket or similar sealing device is usually employed at the cooperating edges of the two pieces.

Most pressure cookers have a short vertical tubular member extending upwardly from the cover on which an overhanging and loosely fitting weight is placed. When the pressure within the vessel exceeds that which the weight is adapted to control the pressure lifts the weight slightly and releases the excess pressure. In the use of pressure cookers it sometimes happens that the weight becomes stuck on the tubular member and will not release the pressure as it should. Also it sometimes happens that the hole through the tubular member becomes blocked by food particles so that the pressure cannot be released therethrough. To preclude the danger of the vessel exploding due to the build-up of excessive pressures in the above instances, most manufacturers incorporate in the lids small replaceable over-pressure or blow-out safety plugs which will blow out and release the pressure before it can reach the danger point. These safety plugs are usually disk-shaped and include a soft metal crimped or otherwise held in a short sleeve screwed into the lid, the disk being blown out of the sleeve when the pressure reaches an excessive amount. Also, after a period of time the disks may blow out before the pressure which the weight is designed to control is reached due to ageing and/or other defects in the disks. Obviously, when the disks are blown out, and particularly when the blow-out is caused by pressure above that which the weight is adapted to control, the disks leave the cover with considerable force and are likely to cause damage and/or physical injury to anyone nearby.

In view of the above it is one of the objects of the present invention to provide a device for attachment to a pressure cooker for catching and retaining the disks when they are blown out of the safety plugs.

Another object of the invention is to provide such a device which may be readily and conveniently associated and disassociated with a pressure cooker.

Still another object of the present invention is to provide in a modification thereof a device of the above nature which may be made a part of or permanently attached to the cover of the pressure cooker.

The above and further objects, features and advantages of the present invention will be more apparent in the following detailed description of the preferred and modified forms thereof wherein reference is made to the accompanying drawings, in the latter of which:

Fig. 1 is a plan view of a part of a pressure cooker lid with the device of the present invention associated therewith;

Fig. 2 is a vertical sectional view taken substantially on line 2—2 of Fig. 1 and showing a part of the pressure cooker pan and cover in section;

Figs. 3 and 4 are plan and elevational views respectively of a modified form of the invention; and Fig. 5 is a plan view of a second modified form of the invention adapted to be permanently attached to the cover.

Referring now to the drawings and particularly Figs. 1 and 2 showing the preferred form of the invention, reference numerals 11 and 12 indicate in general sections of the pan and cover respectively of a particular type pressure cooker to which the invention is applied. The pan 11 has at the upper rim thereof a flat circular section 13 from which extends a plurality of radial projections 14, only one of which is shown in Fig. 2. The cover 12 has a flat circular section 16 which overlies the section 13 and projections 14, and at the outer edge thereof a depending rim 17. Inwardly extending projections 18, only one of which is shown in Fig. 2, at the bottom of the rim 17 are adapted to engage the undersides of the pan projections 14 and lock the cover to the pan when the cover is placed thereon and the two units rotated a slight amount in opposite directions. Suitable handles (not shown) are provided for this purpose, and a rubber or rubber-like gasket 20 seals the cooperating edges of the two units.

Threaded into the central portion of the cover 12 is a stem 21 with a substantially cone-shaped top and a passageway 22 extending along the length thereof. A weight 23 is adapted to rest on the stem 21 and has a plurality of holes 24 therein so arranged and shaped that the weight is lifted by different pressures within the cooker depending upon which one of several holes 24 engages the stem 21. Normally the weight 23 vibrates or jiggles around on the stem 21 to maintain the pressure within the cooker for which it is set.

To the left of the stem 21 as shown in Fig. 2 is the over-pressure or safety plug 26 which is threaded into the cover 12 from the inside and which has a central disk 27. It is the disk 27 which blows out when the pressure inside the cooker reaches dangerous limits which might be due to a stuck weight 23 or blocked or clogged passage 22 in the stem 21. The disk 27 blows out with explosive force and the present invention is directed to the elimination of the hazards incident thereto.

In accordance with the invention a removable cage is clamped to the cover to catch the disk when it blows out. The cage indicated generally by reference numeral 28 in Figs. 1 and 2, includes a cup-shaped wire mesh section 29 suitably secured to a pair of wires 31 bent into substantial conformity with the outer surface of the cover 12. The mesh section 29 overlies the plug 27 and the wires are of suitable springy material such as steel. As shown in Fig. 1, the right-hand ends are so shaped as at 32 to readily snap on and remain engaged with the stem 21 adjacent the cover 12. The opposite ends of the wires 31, or the left hand ends as shown in Fig. 2, are bent to slightly engage the underside of the cover edge and are so arranged as at 33 to be snapped into place when the cage 28 is pressed on the cover. The wires 31 may be joined at their ends 33 or by a lateral brace 34 welded thereto to strengthen the same. Another lateral brace 36 may be welded or otherwise secured to the rightwardly extending sections of the wires 31.

Thus in accordance with this modification of the invention there is provided a device that is easily attached and removed from a pressure cooker cover to catch the disk of the safety plug and which does not interfere in any respect with the use of the cooker.

The modification of the invention shown in Figs. 3 and 4, indicated generally by reference numeral 35, is made of one piece of suitable material and has an inverted perforated cup-shaped section 37 adjacent the center thereof adapted to overlie the safety plug with the right hand end 38 bifurcated to snap on and engage the stem 21. The left hand end 39 is shaped similarly to the left hand end of the wires 31 and is adapted to be pressed on and engage the underside of the cover edge.

The modification of Fig. 5 is arranged to be permanently attached to the cover 12 under the shoulder of the stem 21 with the stem extending through the opening 41 in section 42. A cup-shaped wire mesh member 43 with a rightwardly extending arm 44 is hingedly secured to the section 42 and is of such a length that the mesh member 43 overlies the safety plug in the cover.

While the invention has been described in its preferred and two modified forms and as it may be associated with a particular type of pressure cooker by way of example only, it will be obvious that the principles of the invention are equally applicable to other types of pressure cookers and that many other modifications can be made of the invention without departing from the spirit or essential attributes thereof, and it is desired therefore that only such limitations be placed thereon as are imposed by the appended claim.

What is claimed is:

In a device of the type described for use with a domestic type pressure cooker having a cover with an excess pressure blow-out disk therein, said device including a pair of spaced apart flexible rod-like members secured together at a plurality of points intermediate the ends thereof, an inverted cup-shaped cage member secured to said rod-like members, means including the flexibility of said rod-like members and reverse opposed bends at one pair of adjacent ends thereof to detently engage an upwardly extending stem on said cover and means including reverse bends in each of the other pair of adjacent ends of said rod-like members to detently engage the edge of said cover, said arms conforming generally to the contour of a part of said cover and with the ends thereof engaged with said stem and cover edge being adapted to position said cage over said blow-out disk.

References Cited in the file of this patent

UNITED STATES PATENTS

| 1,662,343 | Sharpneck et al. | Mar. 13, 1928 |
| 2,538,583 | Morrison | Jan. 16, 1951 |

OTHER REFERENCES

Ekco Pressure Cooker Ad. Oct. 14, 1947, page A-9 of Washington Evening Star.